United States Patent
Iwaki (10) Patent No.: US 8,351,094 B2
(45) Date of Patent: Jan. 8, 2013

(54) SHEET PRESENCE DETECTING APPARATUS, IMAGE READING APPARATUS, METHOD FOR DETECTING A SHEET PRESENCE AND METHOD FOR READING AN IMAGE IN A SHEET

(75) Inventor: Kazuhiko Iwaki, Shizuoka (JP)

(73) Assignee: NEC Access Technica, Ltd., Kakegawa-Shi (JP)

( * ) Notice: Subject to any disclaimer, the term of this patent is extended or adjusted under 35 U.S.C. 154(b) by 723 days.

(21) Appl. No.: 12/507,555

(22) Filed: Jul. 22, 2009

(65) Prior Publication Data

US 2010/0020366 A1   Jan. 28, 2010

(30) Foreign Application Priority Data

Jul. 25, 2008  (JP) ................................. 2008-191745

(51) Int. Cl.
*H04N 1/04* (2006.01)
*H04N 1/40* (2006.01)

(52) U.S. Cl. ........ 358/488; 358/486; 358/497; 358/474; 358/449; 358/465; 358/444

(58) Field of Classification Search ................... 358/488, 358/486, 497, 494, 474, 449, 464–466; 382/312, 382/318, 319, 291
See application file for complete search history.

(56) References Cited

U.S. PATENT DOCUMENTS

| 7,471,424 B2* | 12/2008 | Ishido et al. | 358/449 |
| 8,014,044 B2* | 9/2011 | Shiga et al. | 358/488 |
| 2009/0323131 A1* | 12/2009 | Toyoda | 358/448 |

FOREIGN PATENT DOCUMENTS

| JP | 2004-125975 | 4/2004 |
| JP | 2005-311590 | 11/2005 |
| JP | 2006-014014 | 1/2006 |
| JP | 2000-184144 | 6/2006 |
| JP | 2008-026713 | 2/2008 |

OTHER PUBLICATIONS

Japanese Patent Office issued a Japanese Office Action dated May 12, 2010, Application No. 2008-191745.

* cited by examiner

*Primary Examiner* — Cheukfan Lee
(74) *Attorney, Agent, or Firm* — Young & Thompson (57) ABSTRACT

An image reading apparatus includes a transparent plate for mounting a sheet, a sheet cover having a light reflecting plate for reflecting light passing through the transparent plate, a storage unit for storing first profile information involving plural darkness data of reflection light from the light reflecting plate detected by an image sensor in advance when a speed of closing the sheet cover is changed variously without the sheet mounted on the transparent plate, and for storing second profile information involving plural darkness data of reflection light detected by the image sensor when the sheet is mounted on the transparent plate and the sheet cover is closed, and a control unit for comparing the first profile information with the second profile information stored in the storage unit, and for determining that a sheet is mounted on the transparent plate when there is a predetermined difference therebetween.

7 Claims, 6 Drawing Sheets

| POS1 | POS2 | POS3 | POS4 |
|---:|---:|---:|---:|
| 0 | 6 | 17 | 0 |
| 10 | 10 | 16 | 0 |
| 20 | 15 | 16 | 0 |
| 30 | 20 | 17 | 0 |
| 40 | 27 | 18 | 0 |
| 50 | 33 | 21 | 0 |
| 60 | 40 | 25 | 0 |
| 70 | 48 | 30 | 0 |
| 80 | 56 | 35 | 15 |
| 90 | 65 | 42 | 16 |
| 100 | 74 | 50 | 18 |
| 110 | 83 | 59 | 21 |
| 120 | 94 | 68 | 27 |
| 130 | 104 | 79 | 36 |
| 140 | 116 | 91 | 46 |
| 150 | 127 | 104 | 59 |
| 160 | 140 | 117 | 74 |
| 170 | 153 | 132 | 93 |
| 180 | 166 | 148 | 114 |
| 190 | 180 | 164 | 138 |
| 200 | 194 | 182 | 166 |
| 210 | 209 | 201 | 196 |
| 220 | 225 | 221 | 231 |
| 230 | 241 | 241 | 269 |
| 240 | 257 | 263 | 310 |
| 250 | 274 | 286 | 356 |

SHEET PRESENCE DETECTING APPARATUS, IMAGE READING APPARATUS, METHOD FOR DETECTING A SHEET PRESENCE AND METHOD FOR READING AN IMAGE IN A SHEET

INCORPORATION BY REFERENCE

This application is based upon and claims the benefit of priority from Japanese Patent Application No. JP 2008-191745, filed on Jul. 25, 2008 the disclosure of which is incorporated herein in its entirety by reference.

BACKGROUND OF THE INVENTION

1. Technical Field

The present invention relates to a sheet presence detecting apparatus, an image reading apparatus, a method for detecting a sheet presence and a method for reading an image in a sheet, in which the presence of the sheet is detected by using of a CCD (Charge Coupled Device) sensor. In particular, the present invention relates to a sheet presence detecting apparatus, an image reading apparatus, a method for detecting a sheet presence and a method for reading an image in a sheet, in which the sheet is mounted on a sheet mounting glass and the sheet mounting glass is covered with a sheet cover and then, the sheet presence is detected by using the CCD sensor.

2. Background Art

There is an apparatus which determined whether a sheet is mounted on a sheet mounting glass by using a CCD sensor. In case that the CCD sensor is used in order to detect the sheet presence, it is not necessary to install additionally a specific sensor for detecting the sheet presence. Accordingly, it is possible to lower cost of the apparatus.

However, when the CCD sensor is used for the detection of the sheet presence, the detection result on the sheet presence is affected by variation due to a kind of the sheet, a state of a sheet cover, a speed of closing the sheet cover or the like. A related art 1 (Japanese Patent Application Laid-Open No. 2000-184144) discloses an image reading apparatus which determines a kind of a sheet cover when power is supplied initially to the apparatus, and detects an edge of the sheet based on darkness information which is corresponding to the determination of the kind of the sheet cover.

SUMMARY

An object of the present invention is to provide a sheet presence detecting apparatus, an image reading apparatus, a method for detecting a sheet presence, a method for reading an image in a sheet, a control program thereof and a storage medium for the control program, which can make a detection result on the sheet presence without being affected by variation due to a kind of the sheet, a state of a sheet cover, a speed of closing the sheet cover or the like.

A sheet presence detecting apparatus according for an exemplary object of the invention includes a transparent plate for mounting a sheet, a light reflecting plate for reflecting light which passes through the transparent plate, a light source for emitting light to the transparent plate when an angle formed by the light reflecting plate and the transparent plate becomes a predetermined angle, an image sensor for detecting light emitted from the light source, a memory for storing a plurality of detection outputs which are detected by the image sensor and each associated with a speed of closing the light reflecting plate when the sheet is not mounted and a control circuit for calculating a difference between the detection outputs stored in the memory and detection outputs detected at time of detection, and for determining whether a sheet is mounted on the transparent plate or not based on the calculated difference.

An image reading apparatus which reads an image in a sheet on a transparent plate according for an exemplary object of the invention includes a storage means for storing first profile information which involves a plural of darkness data of reflection light from a light reflecting plate which are detected by an image sensor in advance when a speed of closing a sheet cover is changed variously without the sheet mounted on the transparent plate, and for storing second profile information which involves a plural of darkness data of reflection light which are detected by the image sensor when the sheet is mounted on the transparent plate and the sheet cover is closed and a control means for comparing the first profile information with the second profile information stored in the storage means, and for determining that a sheet is mounted on the transparent plate when there is a predetermined difference therebetween.

A method for detecting a sheet presence according for an exemplary object of the invention includes storing a plurality of detection outputs which are detected by an image sensor and each associated with a speed of closing a light reflecting plate when a sheet is not mounted on a transparent plate, emitting light to the transparent plate when an angle formed by the light reflecting plate and the transparent plate becomes a predetermined angle at time of detection, reflecting the light which passes through the transparent plate by using the light reflecting plate, detecting the reflection light by using the image sensor and calculating a difference between a detection output of the time of detection and the stored detection output, and determining whether a sheet is mounted on the transparent plate or not based on the calculated difference.

A method for reading an image in a sheet according for an exemplary object of the invention includes detecting reflection light reflected by the light reflecting plate which is depending on a speed of closing a light reflecting plate when the sheet is not mounted on a transparent plate and storing darkness data which is corresponding to the detection output of the reflection light as first profile information in advance, detecting reflection light of a time of detection with the sheet being mounted on the transparent plate and with the light reflecting plate being closed, and storing darkness data which is corresponding to the detection output of the time of detection as second profile information and comparing the second profile information with the first profile information, determining that a sheet is mounted when there is a predetermined difference between the first profile information and the second profile information and reading an image in the sheet.

A control program according for an exemplary object of the invention to make a computer of an apparatus with a memory, which stores a detection output of an image sensor in association with each speed of closing a light reflecting plate in a state that a sheet is not mounted, carry out a procedure of emitting light to a transparent plate in case that an angle of the light reflecting plate with the transparent plate becomes identical to a predetermined angle, a procedure of reflecting the light which passes through the transparent plate, a procedure of detecting the reflection light, a procedure of calculating a difference between a detection output at the time of detection and the stored detection output and a procedure of determining whether a sheet is mounted on the transparent plate, based on the calculated difference.

A storage medium, according for an exemplary object of the invention, readable by a computer of an apparatus equipped with a memory, which stores a detection output of an image sensor in association with each speed of closing a light reflecting plate in a state that a sheet is not mounted, stores a program to make the computer carry out a procedure of emitting light to a transparent plate in case that an angle of the light 5 reflecting plate with the transparent plate becomes identical to a predetermined angle, a procedure of reflecting the light which passes through the transparent plate, a procedure of detecting the reflection light, a procedure of calculating a difference between a detection output at the time of detection and the stored detection output, and a procedure of determining whether a sheet is mounted on the transparent plate, based on the calculated difference.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

A First Exemplary Embodiment of the Present Invention

Figure 1:
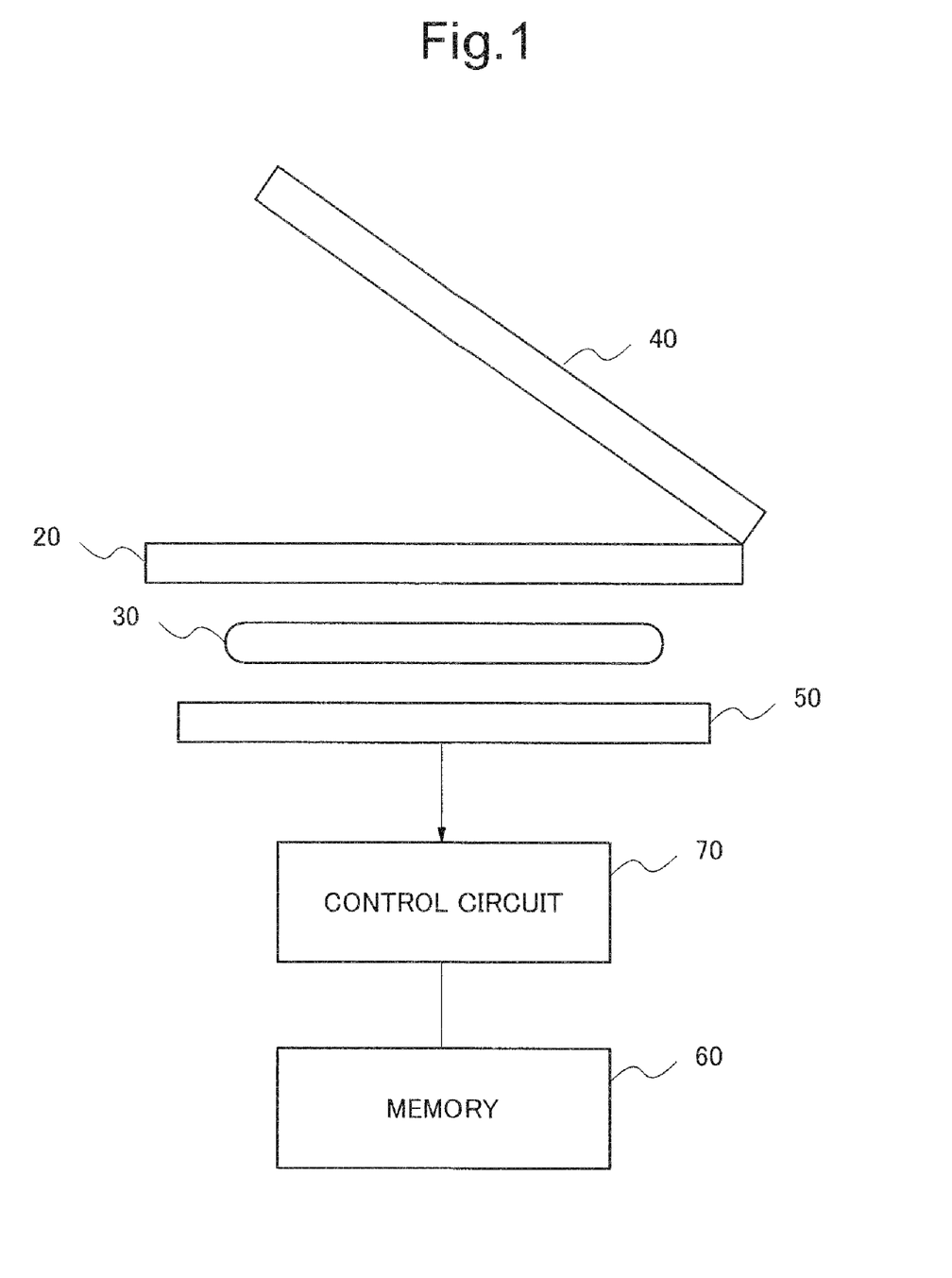
FIG. 1 is a configuration diagram of a sheet presence detecting apparatus according to a first exemplary embodiment of the present invention.

A first exemplary embodiment of the present invention will be described in the following. FIG. 1 is a configuration diagram of a sheet presence detecting apparatus according to the first exemplary embodiment of the present invention. In FIG. 1, the sheet presence detecting apparatus includes a transparent plate 20, a light source 30, a light reflecting plate 40, an image sensor 50, a memory 60 and a control circuit 70. A sheet is mounted on the transparent plate 20, according to the exemplary embodiment of the present invention. When an angle formed by the light reflecting plate 40 and the transparent plate 20 is a predetermined angle, the light source 30 emits light toward the transparent plate 20. The light reflecting plate 40 reflects light which passes through the transparent plate 20. The image sensor 50 detects reflection light which is re-passed through the transparent plate 20. Here, the detected reflection light is mainly reflected from the light reflecting plate 40 or the sheet, and is linear in a main scanning direction. For example, a CCD sensor is applied to the image sensor 50. The memory 60 stores a detection output of the image sensor 50 in association with a speed of closing the light reflecting plate 40, in a state that the sheet is not mounted. The control circuit 70 determines whether the sheet is mounted on the transparent plate 20 or not.

According to the exemplary embodiment of the present invention, in case that the sheet presence detecting apparatus detects the sheet presence, the light source 30 emits light when the angle formed by the reflection plate 40 and the transparent plate 20 becomes the predetermined angle. Here, the time when the angle becomes the predetermined angle will be described as time of detection. When the light source 30 emits light, the image sensor 50 detects the reflection light of the time of detection. The control circuit 70 calculates a difference between the detection output detected of the time of detection and the detection output stored in the memory 60, and determines whether the sheet is mounted on the transparent plate 20 or not based on the calculated difference.

In case that, for example, the calculated difference is larger than a predetermined threshold value, the control circuit 70 determines that the sheet is mounted on the transparent plate 20. Here, it is possible that the predetermined threshold value is stored in the memory 60 in advance.

According to the exemplary embodiment of the present invention, the sheet presence detecting apparatus uses the detection output which is associated with the speed of closing the light reflecting plate 40 in order to detect the sheet presence, so it is possible to detect the sheet presence in consideration of the speed of closing the light reflecting plate 40. Accordingly, a detection result on the sheet presence is not affected by variation due to the speed of the light reflecting plate 40.

Moreover, according to the exemplary embodiment of the present invention, since the sheet presence detecting apparatus uses the difference between the detection output at the time of detection and the detection output which is stored in the memory 60 in order to detect the sheet presence, it is possible to avoid influence due to the kind of sheet and the state of the light reflecting plate 40. Consequently, according to the sheet presence detecting apparatus of the exemplary embodiment of the present invention, the detection result on the sheet presence is not affected by variation due to the kind of the sheet and the state of the light reflecting plate 40.

A Second Exemplary Embodiment of the Present Invention

Figure 2:
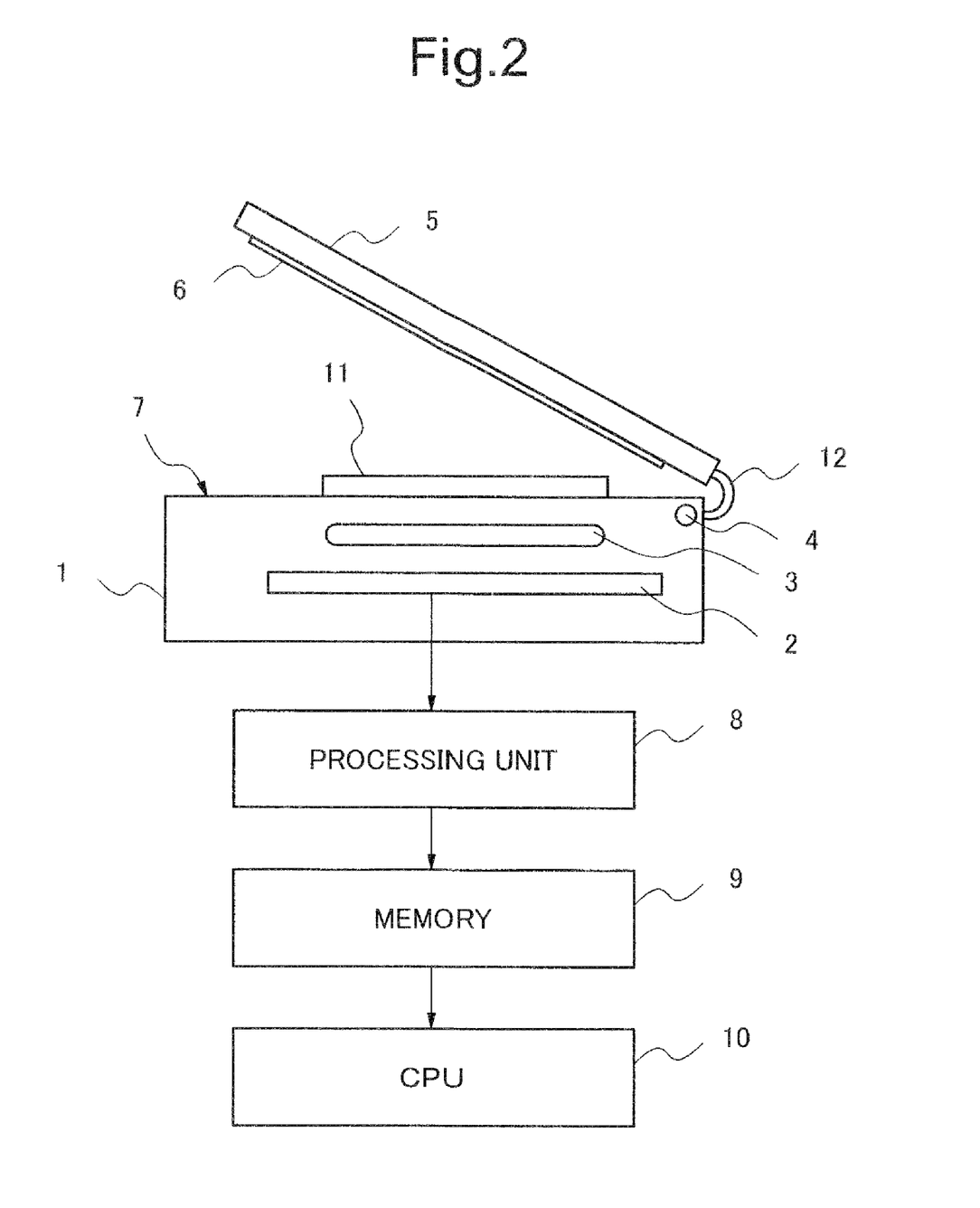
FIG. 2 is a configuration diagram of an image reading apparatus according to a second exemplary embodiment of the present invention.

A second exemplary embodiment of the present invention will be described in the following. FIG. 2 is a configuration diagram of an image reading apparatus according to the second exemplary embodiment of the present invention. As shown in FIG. 2, the image reading apparatus includes an apparatus main body 1, a CCD sensor 2, a lamp 3, an angle sensor 4, a sheet cover 5, a white back plate 6, a sheet mounting glass 7, a hinge 12, a processing unit 8, a memory 9 and a CPU 10. Here, the CCD sensor 2, the lamp 3, the sheet cover 5 with the white back plate 6, the sheet mounting glass 7, and the processing unit 8 and the CPU 10 are corresponding to the image sensor, the light source, the light reflecting plate, the transparent plate and the control circuit respectively. An object numbered 11 in FIG. 2 is a sheet putted on the sheet mounting glass 7.

The CCD sensor 2, the lamp 3 and the angle sensor 4 are arranged in the inside of the apparatus main body 1 and the sheet mounting glass 7 is arranged on the apparatus main body 1. Moreover, the CCD sensor 2 and the lamp 3 are arranged in main scanning direction of the sheet 11 in the inside of the apparatus main body 1. The CCD sensor 2 detects the reflection light emitted by the lamp 3 which is linear in the main scanning direction. The hinge 12, which is arranged on one end of the sheet cover 5, makes the sheet cover 5 opened and closed freely for the apparatus main body 1. When the sheet cover 5 is closed, the sheet cover 5 covers the sheet mounting glass 7. The white back plate 6 is arranged on the sheet cover 5 oppositely to the sheet mounting glass 7 and reflects the light which passes through the sheet mounting glass 7.

The angle sensor 4 detects an angle formed by the sheet cover 5 and the apparatus main body 1 becoming an angle α. According to the exemplary embodiment of the present invention, the angle α is assumed to be 10 degrees. When the angle formed by the sheet cover 5 and the apparatus main body 1 becomes the angle α, the lamp 3 emits light toward the sheet mounting glass 7. A part of the light emitted by the lamp 3 passes through the sheet mounting glass 7 and then, is reflected by the sheet 11 or the white back plate 6.

The CCD sensor 2 detects the light reflected by the sheet 11 or the white back plate 6. In case of no reflection light from the sheet 11 and the white back plate 6, the detection output of the CCD sensor 2 becomes black. On the other hand, in case of much reflection light from the sheet 11 or the white back plate 6, the detection output becomes white. The processing unit 8 digitizes the detection output of the CCD sensor 2 and outputs the digitized detection output as darkness data. According to the exemplary embodiment of the present invention, in case that the detection output of the CCD sensor 2 is black, the processing unit 8 outputs darkness data "0". As the detection output of the CCD sensor 2 becomes white, the processing unit 8 outputs the darkness data which has a larger numerical value. The memory 9 stores first profile information. The CPU 10 determines whether the sheet 11 is putted on the sheet mounting glass 7 or not by using of the first profile information. The first profile information will be described later.

Here, in case that the sheet 11 is not putted on the sheet mounting glass 7, the detection output of the CCD sensor 2 will be described in the following. When the sheet 11 is not putted on the sheet mounting glass 7, the detection output of the CCD sensor 2 depends on an opening or closing state of the sheet cover 5. That is, when the sheet cover 5 is open, the detection output of the CCD sensor 2 becomes black, because there is no reflection light from the white back plate 6 of the sheet cover 5. On the other hand, when the sheet cover 5 is closed or is not closed perfectly, the detection output of the CCD sensor 2 becomes white or gray, because there is the light reflected by the white back plate 6 partially.

Figure 3:
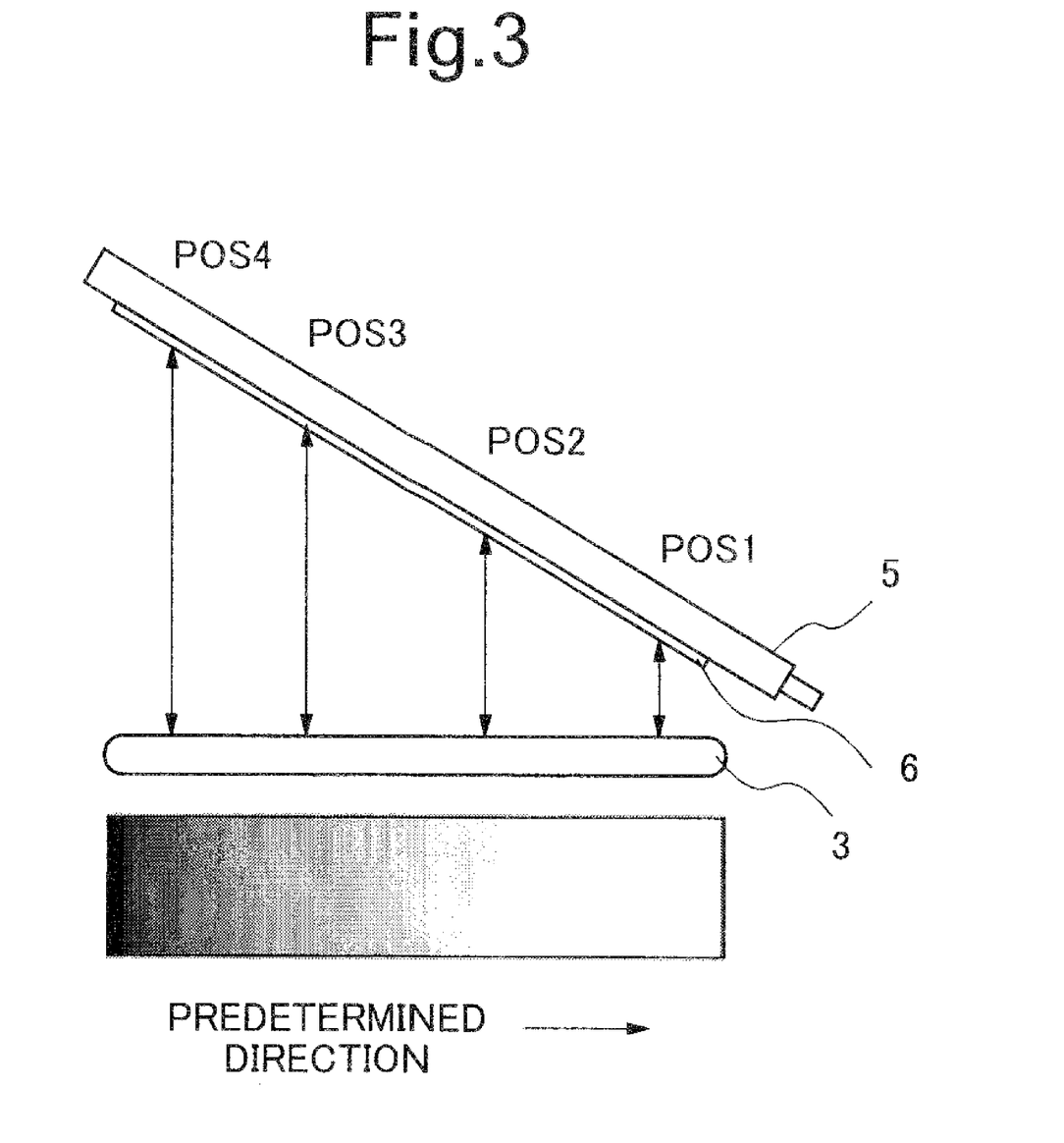
FIG. 3 shows a relation between distance from a hinge 12 and a detection output of a CCD sensor 2.

According to the image reading apparatus shown in FIG. 2, when the sheet cover 5 is not closed perfectly, the detection output of the CCD sensor 2 depends on a distance from the hinge 12. When the distance from the hinge 12 is short, there exists much reflection light by the white back plate 6, and consequently, the detection output of the CCD sensor 2 becomes white. FIG. 3 exemplifies a relation between the detection output of the CCD sensor 2 and the distance from the hinge 12 when the sheet cover 5 is not closed perfectly. In FIG. 3, POSs 1 to 4 indicate a plurality of positions in the main scanning direction, and the POSs become far from the hinge 12 in order of POS 1, POS 2, POS 3 and POS 4. Here, a predetermined direction is assumed to be parallel to the main scanning direction toward the hinge 12 (in FIG. 3, direction from left side to right side) The detection output of the CCD sensor 2 becomes white as the position shifts in the predetermined direction. The state of the detection output of the CCD sensor 2 in the prescribed direction will be described as a distribution of the detection output in the following.

Figure 4:
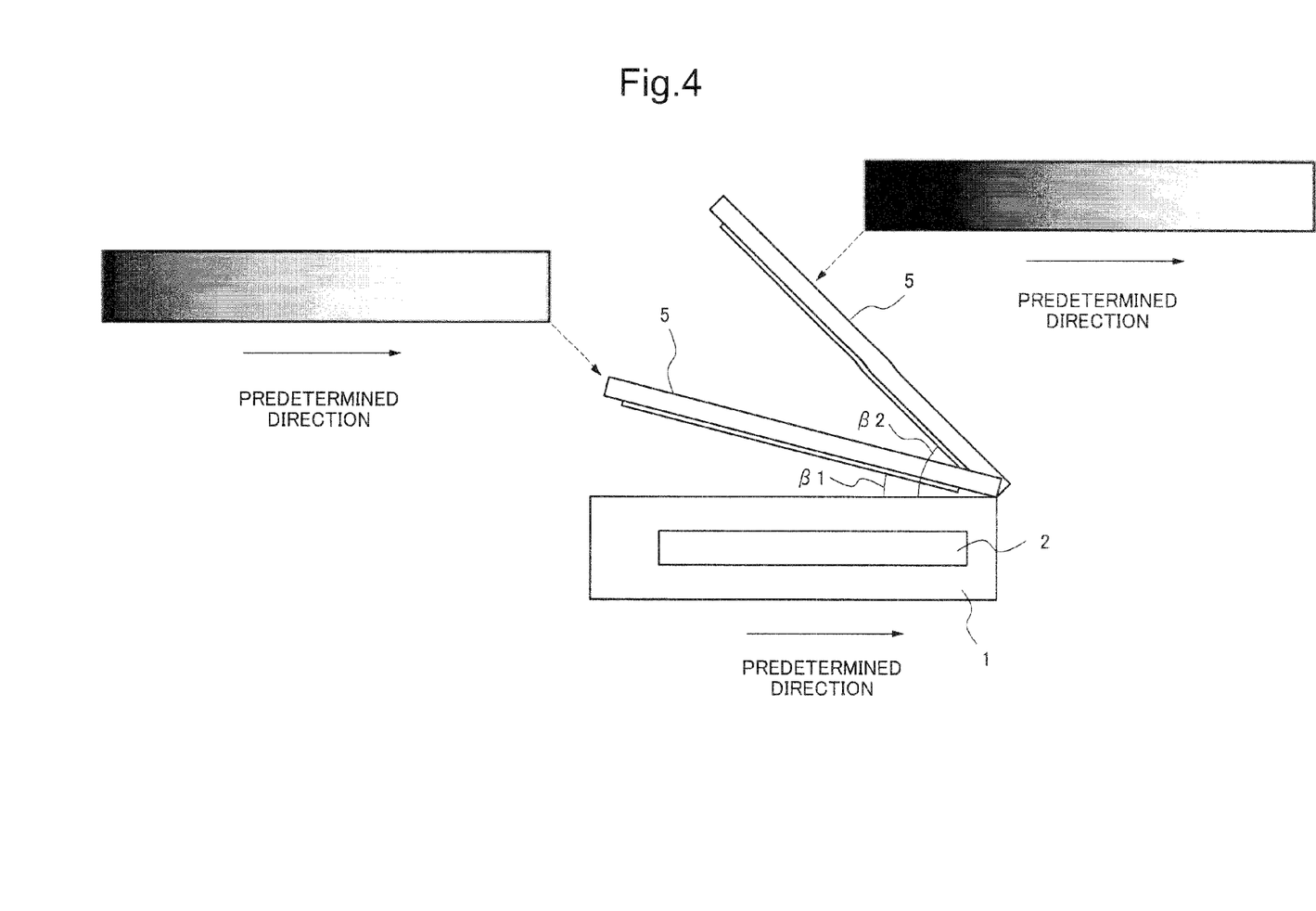
FIG. 4 shows a relation between an angle formed by a sheet cover 5 and a main body 1 of an apparatus and the detection output of the CCD sensor 2.

According to the image reading apparatus shown in FIG. 2, when the sheet cover 5 is not closed perfectly, the distribution of the detection output, moreover, depends on the angle formed by the sheet cover 5 and the apparatus main body 1. As the angle becomes small, there exists more reflection light from the white back plate 6, and consequently, the distribution of the detection output becomes white. FIG. 4 exemplifies a state of apparatus and the distribution of the detection output when the angle formed by the sheet cover 5 and the apparatus main body 1 is changed. According to FIG. 4, as the angle is small (angle is denoted as β1 in figure), the distribution of the detection output shifts toward white. On the other hand, as the angle is large (angle is denoted as β2 in figure), the distribution of the detection output shifts toward black.

Here, the CCD sensor 2 generally detects the reflection light when the light emitted by the lamp 3 becomes stable. In this case, the detection output of the CCD sensor 2 depends on a speed of closing the sheet cover 5. The reason is that the speed of closing the sheet cover 5 makes the angle formed by the sheet cover 5 and the apparatus main body 1 vary at a time when the light emitted by the lamp 3 becomes stable. For example, if the speed of closing the sheet cover 5 is fast, the angle at a time when the light emitted by the lamp 3 becomes stable will become small and consequently, the distribution of the detection output shifts toward white. That is, as the speed of closing the sheet cover 5 is fast, the distribution of the detection output shifts toward white. Accordingly, if a threshold value is merely set based on the detection output of the CCD sensor 2 and the presence of the sheet 11 is detected based on the threshold value, a probability of false detection of the sheet presence becomes high. In the exemplary embodiment of the present invent ion, the image reading apparatus creates the first profile information based on the detection output of the CCD sensor 2 which is obtained through changing the speed of closing the sheet cover 5, and it determines whether the sheet 11 Is putted or not by using the first profile information.

Figure 5:
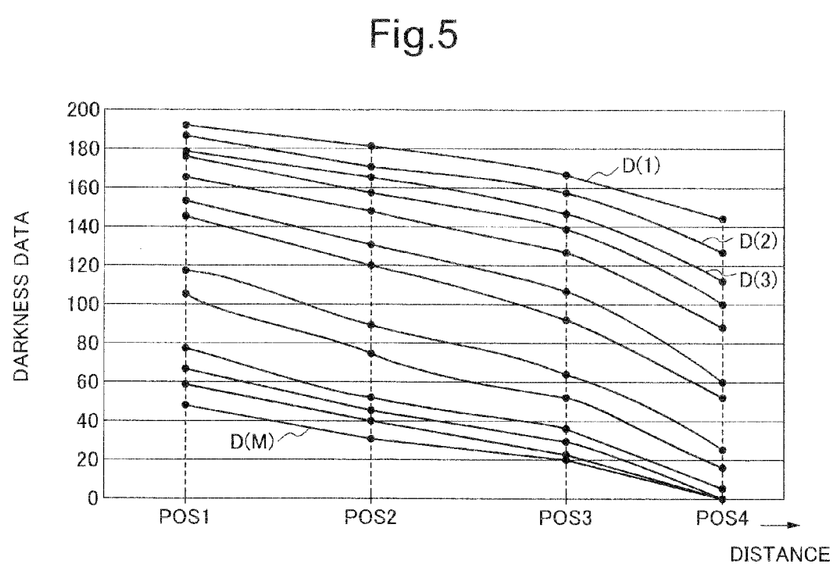
FIG. 5 shows an example of first profile information.

A procedure for creating the first profile information will be described in the following. First, in the exemplary embodiment of the present invention, the image reading apparatus detects reflection lights by using the CCD sensor 2 when the speed of closing the sheet cover 5 changes variously without the sheet 11 on the sheet mounting glass 7. The image reading apparatus digitizes the detection output of the CCD sensor 2 by using the processing unit 8 and then, obtains darkness data. The image reading apparatus associates the darkness data with the distance from the hinge 12 for each speed of closing the sheet cover 5, and stores the association result in the memory 9 as the first profile information. An example of the first profile information is shown in FIG. 5. Here, the darkness data which are associated with the distances from the hinge 12 will be described as a darkness distribution in the following. The first profile information consists of a plurality of darkness distributions (M darkness distributions) that is, D(1) to D(M).

Next, a procedure for reading the image in the sheet 11 by using the first profile information shown in FIG. 5 will be described in the following. An user opens the sheet cover 5 of the image reading apparatus and puts the sheet 11 on the sheet mounting glass 7. Then, the user closes the sheet cover 5 and carries out an operation for reading the image in the sheet 11. When the angle sensor 4 of the image reading apparatus detects that the angle formed by the sheet cover 5 and the apparatus main body 1 becomes the angle α, the lamp 3 emits light. When the light emitted by the lamp 3 becomes stable, the CCD sensor 2 detects the reflection light. Here, the time when the light emitted by the lamp 3 becomes stable will be described as time of detection in the following. The CPU 10 obtains the darkness data from the detection output of the CCD sensor 2 at the time of detection by using the processing unit 8. Moreover, the CPU 10 obtains the darkness distribution of the time of detection by associating the darkness data of the time of detection with the distance from the hinge 12, and stores the darkness distribution of the time of detection in the memory 9 as second profile information. The CPU 10 determines whether the sheet 11 is putted or not based on the first profile information and the second profile information, and reads the image in the sheet 11.

Here, it is not necessary to use all of the darkness data of the darkness distribution as the first and the second profile information for determining the presence of the sheet 11. It is possible, for example, that some darkness data n corresponding to darkness data at positions which are apart each other in a predetermined direction can be use. In the exemplary embodiment of the present invention, the darkness data at four positions (POSs), that is, at POSs 1 to 4 shown in FIG. 3, are selected from the first and the second profile information and are used for detection of the sheet presence. The number of the darkness data for detection of the sheet presence is not limited to four. If the number of the darkness data is few, a probability of false detection becomes high. On the other hand, if the number of the darkness data is large, a load of CPU 10 becomes heavy.

When the presence of the sheet 11 is detected by using four darkness data at POSs 1 to 4, the CPU 10 selects a darkness distribution, whose darkness data at POS 1 is the closest to the darkness data at POS 1 of the second profile information, out of a plurality of darkness distributions D(1) to D(M) shown in FIG. 5. That is, the speed of closing the sheet cover 5 is estimated based on the darkness data at POS 1 of the second profile information. The reason why the darkness data at POS 1 is used is that it receives the least effects due to the presence of the sheet 11 in the darkness data at POSs 1 to 4. Furthermore, the CPU 10 calculates a difference between the darkness data at POSs 1 to 4 of the selected darkness distribution and the darkness data at POSs 1 to 4 of the second profile information respectively, and compares the calculation result with the threshold value. Then, the CPU 10 determinates that the sheet 11 is putted at a position whose calculated difference is larger than the threshold value. For example, if the calculated difference at POS 4 is larger than the threshold value, the CPU 10 determinates that the sheet 11 is putted at the position corresponding to POS 4 on the sheet mounting glass 7.

According to the second exemplary embodiment of the present invention, the image reading apparatus selects the most suitable darkness distribution by using the darkness data at POS 1 which receives the least effects due to the presence of the sheet 11, and consequently estimates the speed of closing the sheet cover 5 as mentioned above. Moreover, when the image reading apparatus detects the presence of the sheet 11 by using the selected darkness distribution, it can prevent that the detection output is affected by variation due to change of the speed of closing the sheet cover 5. Accordingly, in the exemplary embodiment of the present invention, the image reading apparatus can prevent that the detection result on the presence of sheet 11 is affected by variation due to the speed of closing the sheet cover 5.

Moreover, in the exemplary embodiment of the present invention, the image reading apparatus uses the difference between the first profile information and the second profile information, so it is possible to prevent that the detection output is affected by variation which is due to the kind of sheet 11 and the state of the sheet cover 5 (for example, the white back plate 6 is soiled). Consequently, according to the image reading apparatus of the exemplary embodiment of the present invention, the detection result on the presence of sheet 11 is not affected by variation due to the kind of sheet 11 and the state of the sheet cover 5.

Moreover, in the exemplary embodiment of the present invention, the image reading apparatus uses the predetermined number of darkness data in stead of using all of the darkness data included in the darkness distribution, so it is possible to make the load of the CPU 10 light.

Figure 6:
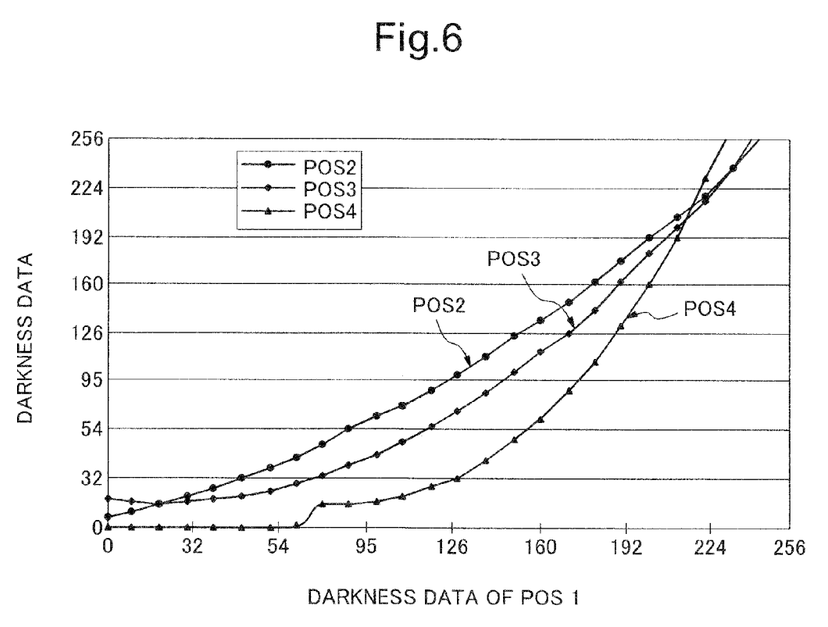
FIG. 6 shows an example of the first profile information which is darkness data at POS 1 associated with darkness data at POSs 2 to 4.
Figure 7:
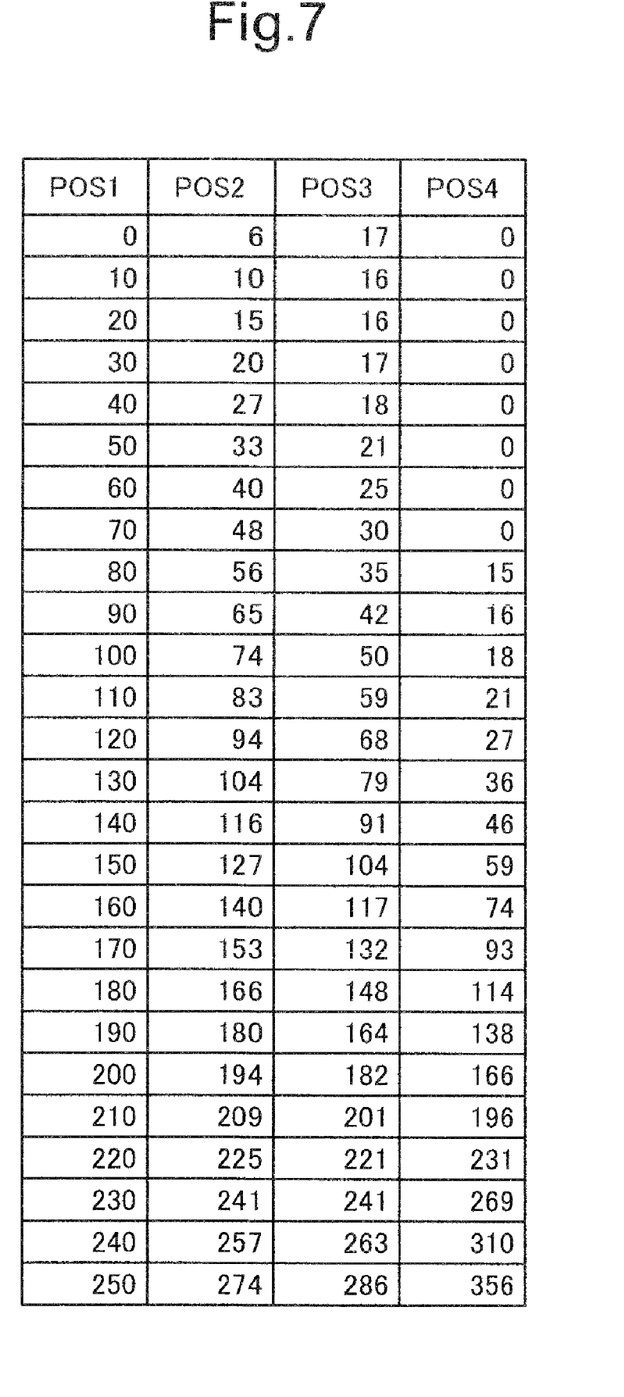
FIG. 7 shows an example of a table which is created on the basis of FIG. 6.

Here, in order to make it easy to select the most suitable darkness distribution by using of the darkness data at POS 1, it is preferable that the CPU 10 makes the memory 9 store the darkness data at POSs 2 to 4 of a plurality of the darkness distributions associated with the darkness data at POS 1 as the first profile information FIG. 6 shows an example of the darkness data at POSs 2 to 4 associated with the darkness data at POS 1. The CPU 10 of the image reading apparatus selects the darkness data at POSs 2 to 4 corresponding to the darkness data at POS 1 of the second profile information from the memory 9 as the first profile information. In this case, the load of the CPU 10 can be made light. Moreover, in case that the darkness data shown in FIG. 6 is stored in a tabular form in the memory 9, the load of CPU 10 becomes lighter. FIG. 7 shows an example of the darkness data in the tabular form.

Here, according to other exemplary embodiment of the present invention, a sheet presence detecting method for determining whether a sheet is mounted on a sheet mounting glass (a transparent plate) or not when an image reading apparatus reads an image in the sheet is realized. According to the detecting method, when no sheet is mounted on the sheet mounting glass, reflection light from a sheet cover (a reflecting plate) at several speeds of closing the sheet cover is detected by an image sensor in advance, and darkness data corresponding to the detection outputs of the image sensor are stored as first profile information. Moreover, in the detecting method, when the sheet is actually mounted on the sheet mounting glass and the sheet cover is closed, a light is emitted at time of detection and the sheet on the sheet mounting glass is detected by the image sensor. Moreover, the darkness data are created based on the detecting output and the darkness data are stored as second profile information. Then, the second profile information is compared with the first profile information stored in advance. If there is a predetermined difference between the first profile information and the second profile information, it is determined that the sheet is mounted on the sheet mounting glass.

According to other exemplary embodiment of the present invention, an image reading apparatus which reads an image in a sheet mounted on a sheet mounting glass (a transparent plate) is realized The image reading apparatus includes a memory which stores first profile information and second profile information and a control unit which compares the first profile information with the second profile information. The control unit determines that the sheet is mounted on the sheet mounting glass when there is a predetermined difference between the information, and reads the image in the sheet. Here, the first profile information is darkness data of reflection light from a sheet cover (a light reflecting plate) which is detected by the image sensor in advance when a speed of closing the sheet cover is changed variously without the sheet mounted on the sheet mounting glass, and the second profile information is darkness data of reflection light which is detected by the image sensor when the sheet is mounted on the sheet mounting glass and the sheet cover is closed.

Moreover, other exemplary embodiment of the present invention can be realized with a program, which makes an apparatus with a memory storing detection outputs detected by an image sensor when a speed of closing a light reflecting plate is changed variously without the sheet mounted on the sheet mounting glass carry out the operation mentioned above, and with a storage medium.

In the sheet presence detecting apparatus or the image reading apparatus according to the above mentioned exemplary embodiments, the control circuit 70 or the processing unit 8 determines whether the sheet 11 is mounted or not control circuit determines whether said sheet is mounted or not based on a comparison result of the difference and a predetermined threshold value.

In the image reading apparatus according to the above mentioned exemplary embodiments, the processing unit 8 selects darkness data of predetermined number at positions which are apart from each other in a predetermined direction out of the first profile information and the second profile information, and compares the selected darkness data of the first profile information with the selected darkness data of the second profile information.

In the image reading apparatus according to the above mentioned exemplary embodiments, the processing unit 8 estimates a speed of closing the sheet cover 5 based on at least one of the darkness data of the second profile information, and compares first profile information which is corresponding to the estimated speed with the second profile information.

The image reading apparatus according to the above mentioned exemplary embodiments further includes the hinge 12 which is installed on one end of the sheet cover 5, and makes the sheet cover 5 connected to the sheet mounting glass 7 so that the sheet cover 5 can be opened and closed freely. Then, the predetermined direction is a direction toward the hinge 12, and the speed is estimated based on darkness data at a position that is the closest to the hinge 12.

The method for reading the image in the sheet 11 according to the above mentioned exemplary embodiments includes selecting information at positions, which are apart each other in a predetermined direction and whose number is predetermined, out of the first profile information and the second profile information and comparing by using of the selected information.

The method for reading the image in the sheet 11 according to the above mentioned exemplary embodiments further includes estimating a speed of closing the sheet cover 5 on the basis of the first profile information which is closest to the second profile information at a specific position out of the positions whose number is predetermined and comparing the first profile information and the second profile information which are corresponding to the estimated speed.

The present invention is not limited to each embodiment mentioned above. It is possible to make various changes in configuration and details of the present invention without departing from the keynote. Moreover, the present invention includes a suitable combination of a part of the configuration of each embodiment and all of configuration of each embodiment.

Here, in case that an image reading apparatus described in the related document 1 is applied for detecting a sheet presence, it may be possible to prevent the detection result on the sheet presence from being affected by variation due to the state of a sheet cover, but it is impossible to prevent the detection result from being affected by variation due to change of a speed of closing the sheet cover.

On the other hand, in case that a sheet presence detecting apparatus and an image reading apparatus related to the present invention are applied for detection of a sheet presence, the following advantage is obtained That is, in order to detect the sheet presence, the sheet presence detecting apparatus and the image reading apparatus related to the present invention use detection outputs which are detected by an image sensor and each associated with a speed of closing a light reflecting plate when the sheet is not mounted on the light reflecting plate. So it is possible to prevent the detection result on the sheet presence from being affected by variation due to the change of the speed of closing the light reflecting plate. Moreover, the sheet presence detecting apparatus and the image reading apparatus calculate a difference between the above-mentioned detection outputs and detection outputs which are detected by the image sensor at time of detection, and use the calculation result in order to detect the sheet presence. So, it is possible to prevent the detection result on the sheet presence from being affected by variation due to the kind of sheet and the state of the sheet cover.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. An image reading apparatus which detects the presence of a sheet reads an image in said sheet, comprising:
    a transparent plate for mounting the sheet thereon;
    a sheet cover having a light reflecting plate mounted thereunder, the light reflecting plate for reflecting light which passes through said transparent plate;
    a storage means for storing first profile information which involves plural darkness data of reflection light from said light reflecting plate which are detected by an image sensor in advance when a speed of closing said sheet cover is changed variously without said sheet mounted on said transparent plate, and for storing second profile information which involves plural darkness data of reflection light which are detected by said image sensor when said sheet is mounted on said transparent plate and said sheet cover is closed; and
    a control means for comparing said first profile information with said second profile information stored in said storage means, and for determining that a sheet is mounted on said transparent plate when there is a predetermined difference therebetween.

2. The image reading apparatus according to claim 1, wherein said control means selects darkness data of a predetermined number at positions which are apart from each other in a predetermined direction out of said first profile information and said second profile information, and compares the selected darkness data of said first profile information with the selected darkness data of said second profile information.

3. The image reading apparatus according to claim 2, wherein said control circuit estimates a speed of closing said sheet cover based on at least one of said darkness data of said second profile information, and compares said first profile information which corresponds to the estimated speed with said second profile information.

4. The image reading apparatus according to claim 3, further comprising:
    a hinge which is installed on one end of said light reflecting plate, and makes said light reflecting plate connected to said transparent plate so that said light reflecting plate can be opened and closed freely, wherein said predetermined direction is a direction toward said hinge, and said speed is estimated based on darkness data at a position that is the closest to said hinge.

5. A method for detecting the presence of a sheet placed on a transparent plate of an image reading apparatus having a light reflecting plate and for reading an image in said sheet, the method comprising:

- detecting reflection light reflected by said light reflecting plate which depends on a speed of closing said light reflecting plate when said sheet is not mounted on said transparent plate to obtain a detection output of said reflection light and storing darkness data which corresponds to said detection output of said reflection light as first profile information in advance;
- detecting reflection light of a time of detection with said sheet mounted on said transparent plate and with said light reflecting plate closed to obtain a detection output of said time of detection, and storing darkness data which corresponds to said detection output of said time of detection as second profile information; and
- comparing said second profile information with said first profile information, determining that a sheet is mounted on said transparent plate when there is a predetermined difference between said first profile information and said second profile information and reading an image in said sheet.

6. The method according to claim 5, further comprising:
selecting information at positions, which are apart from each other in a predetermined direction and a number of which is predetermined, out of said first profile information and said second profile information and comparing by using said selected information.

7. The method according to claim 6, further comprising:
estimating a speed of closing said light reflecting plate on a basis of said first profile information which is closest to said second profile information at a specific position out of said positions, the number of which is predetermined and comparing said first profile information and said second profile information which correspond to said estimated speed.

* * * * *